Sept. 15, 1970 P. H. KENNEMORE 3,528,464
CHAIN SAW TOOTH
Filed Feb. 5, 1968
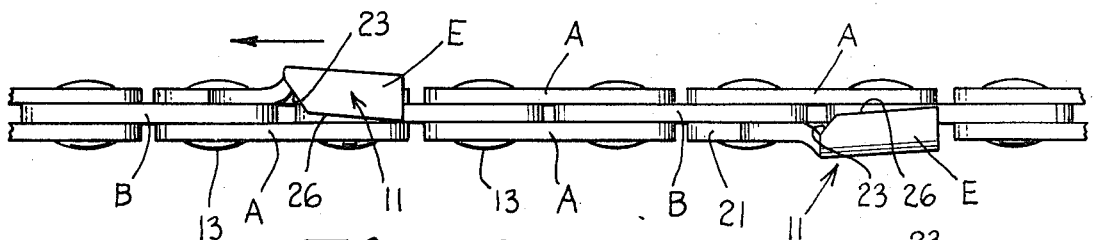
Fig. 1.
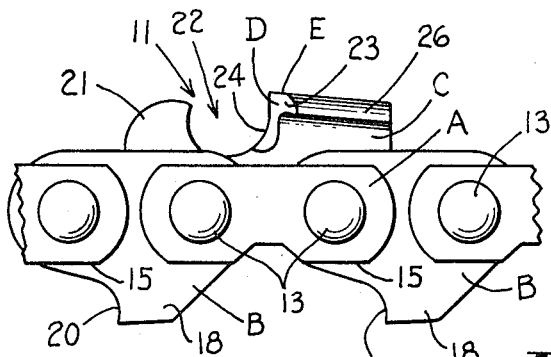
Fig. 2.
Fig. 5A.
Fig. 5B.
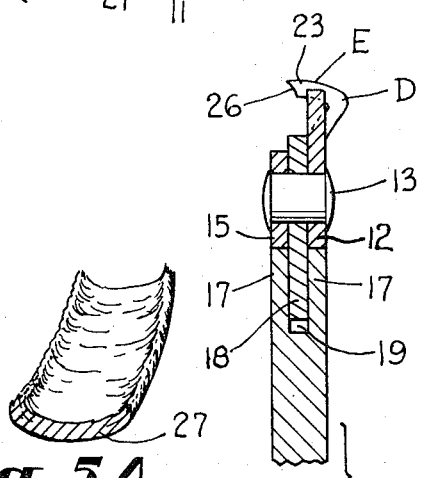
Fig. 4.
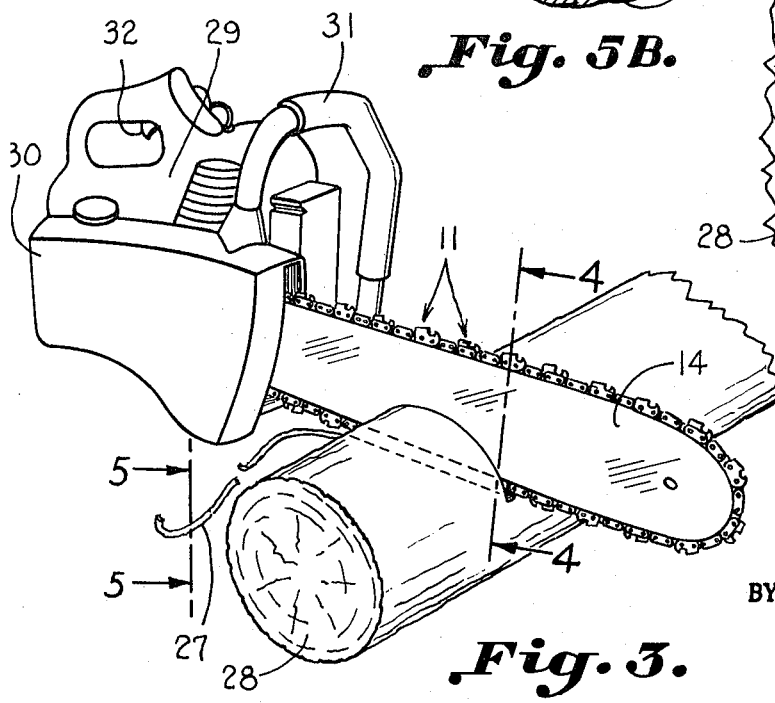
Fig. 3.
INVENTOR.
PAUL H. KENNEMORE
BY Bailey + Douty
ATTORNEYS.

United States Patent Office 3,528,464
Patented Sept. 15, 1970

3,528,464
CHAIN SAW TOOTH
Paul H. Kennemore, P.O. Box 12,
Greenwood, S.C. 29646
Filed Feb. 5, 1968, Ser. No. 702,845
Int. Cl. B27b *33/14*
U.S. Cl. 143—135            1 Claim

ABSTRACT OF THE DISCLOSURE

A saw chain having a plurality of spaced teeth coupled together by means of tie straps and drive links. Each of the teeth having an elongated substantially vertical side plate with an elongated concave intermediate portion integral therewith. An elongated top plate is integral with the intermediate side portion and extends over the longitudinal axis of the chain. The top plate has a front cutting edge and a side cutting edge which extends inwardly toward the rear of the top plate at an angle of about 5° relative to the longitudinal axis, which aids in producing a smooth and clean cut in wood.

---

This invention relates to a saw chain, and more particularly to an improved tooth of a saw chain having a side cutting edge on the top plate for enhancing the cutting operation.

One of the problems of the chain saw is that when such is used fairly constantly the chain wears out rapidly. In addition to normal wear, such is caused by vibration of the chain, as well as improper cutting operation. When using a conventional chain, such as illustrated in the Cox Pat. No. 2,508,784, granted May 23, 1950, or the Merz Pat. No. 2,632,484, granted Mar. 24, 1953, the forward cutting edge of the top plate and the vertical cutting edge adjacent the gullet perform the cutting operation, and the side edge of the top plate merely tears into the wood, producing a rough and shagged chip. This, in turn, causes a bouncing effect to take place when cutting through a log producing undue wear on the sprocket, chain guard, and the root portion of the chain. It, also, causes an unnecessary drag to be imparted to the engine for the chain saw. One well known chain is referred to as the chipper type chain, and the cutting principle involves an outward gouging and inward tearing of the wood by the teeth. This inward tearing is a result of the cutting cycle not being complete.

The chain constructed in accordance with the present invention has the same cutting edges as the conventional chain, however, it also has a cutting edge adjacent the inwardly extending edge of the top plate. In one preferred embodiment this cutting edge is hollow ground and tapers inwardly at an angle of approximately 5°. By using a strobe light the cutting operation can be carefully observed, and it is noted that the chain constructed in accordance with the present invention cuts through the wood much smoother and easier than the conventional chain. This, in turn, reduces the drag on the motor for saw, as well as cuts down on the vibrations produced. The improved operating characteristics of the chain constructed in accordance with the present invention is also evident when comparing the chip produced by the conventional saw chain with that produced thereby. The chip produced by the conventional saw chain is ragged on the edges and in the middle portion, whereas, the chip produced by the saw chain constructed in accordance with the present invention is relatively smooth on the sides and the middle.

Accordingly, it is an important object of the present invention to provide a saw chain which runs smoothly with a minimum amount of vibrations and drag on the motor of the chain saw.

Another important object of the present invention is to provide a chain for a chain saw which has a longitudinal cutting edge adjacent the side of the top plate of the cutting tooth for aiding in producing a clean and complete cut in the wood, thus minimizing vibrations and the bouncing effect normally encountered during cutting operations.

Another important object of the present invention is to provide a cutting edge adjacent the side of the top plate which balances the tooth load and stabilizes the rear portion of the top plate.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a top plan view illustrating a portion of a saw chain which has teeth thereon constructed in accordance with the present invention, FIG. 2 is a side elevational view illustrating a portion of a saw chain of FIG. 1, FIG. 3 is a perspective view illustrating a chain saw which utilizes a chain constructed in accordance with the present invention, FIG. 4 is a transverse sectional view taken along line 4—4 in FIG. 3, FIG. 5A is an enlarged transverse sectional view taken along line 5—5 of FIG. 3 illustrating a chip produced by a chain constructed in accordance with the present invention, and FIG. 5B is a sectional view taken along line 5—5 of FIG. 3 illustrating a chip produced by a conventional chain.

The drawing illustrates a saw chain having a plurality of spaced teeth which are coupled together by means of tie straps A and drive links B. Each of the teeth has an enlongated substantially vertical side plate C with holes therein for receiving rivets for securing the teeth to the tie straps A and the drive links B. An outwardly extending elongated concave intermediate portion D is integral with a top portion of said vertical side plate C, and an elongated top plate E is integral with the intermediate side portion and extends over the longitudinal axis of the saw chain. Such, also tapers downwardly towards the rear of the tooth. The top plate E has a front cutting edge which extends rearwardly at an acute angle, and a side cutting edge which extends inwardly from the intermediate portion D towards the rear of the top plate at an angle of about 5° relative to the longitudinal axis. The side cutting edge has a hollow ground cutting edge thereon so that during the cutting operation such aids in providing a more complete cut of the chip, thereby producing a smooth cut with a minimum amount of vibration and drag on the saw chain motor.

A portion of the saw chain is illustrated in FIGS. 1 and 2 of the drawing. FIG. 3 illustrates the chain carried by a chain saw. The teeth, broadly designated at 11, of the saw chain are coupled together by means of the tie straps A and a drive link B. The foot 12 of each tooth has a pair of longitudinally spaced holes disposed therein for accommodating rivets 13. Each of the tie straps A and the drive links B has a pair of longitudinally spaced apertures therein also. In assembling the chain a hole of the drive link B is placed in alignment with a corresponding hole on the tooth 11 and a tie strap A. A rivet 13 is passed through the apertures of the tie strap A, the drive link B and the tooth 11, in that order, so as to secure them together. It is important that this linkage be a pivotal linkage so that the chain will run properly within the guide bar 14 carried by the chain saw. The other end of the drive link is sandwiched between a pair of tie straps A and a rivet 13 is passed therethrough securing such together. Another drive link B is sandwiched between the other end of the tie straps A and secured thereto by a rivet 13. The second tooth, illustrated in FIG. 1, is joined to the free-end of the drive link B by means of a tie strap A and a rivet 13 passing through the three members.

It is noted that when the chain is running in the guide bar 14 the bottom edge 15 of the tie strap and the foot 12 of each tooth ride on the laterally disposed rails 17 of the guide bar 14. The base 18 of the drive link B rides within the groove 19 defined by the laterally disposed rails 17 of the guide bar 14. The base 18 of the drive link has a tang 20 adjacent its front edge for maintaining the groove 19 of the guide bar 14 clean and free from sawdust, grit, and the like.

FIG. 4 illustrates the desired position of the chain when such is running properly in the guide bar 14. If the chain runs to one side, the bottom edge of the base 18 of the drive link B will wear as a result of the increased frictional contact with an inner surface of the rail 17. If the chain is permitted to run to the side for a period of time, the bottom edge of the drive link will be sharpened to a point impairing its ability to maintain the groove 19 clean. If the groove is not maintained clean, then dirt and sawdust is permitted to collect therein, the chain will not ride smoothly on the guide bar 14, and as a result, undue strain and wear is imparted to the saw chain, the sprocket for such and the motor for the chain saw.

Each of the teeth shown in the drawing includes a top plate E which tapers downwardly towards the rear. A depth gauge 21 is spaced longitudinally from the top plate E and the side plate C, and aids in controlling the depth of the cut being made by the teeth during the sawing operation. A gullet 22 is defined between the depth gauge 21 and the top plate E and the side plate C. Adjacent the front edge of the top plate is a hollow ground cutting edge 23, which is at an angle of 35° relative to a plane normal to the longitudinal axis of the chain. It has been found that such an angle on the cutting edge is the most desired angle for chipper and chisel type chain saw teeth. It is important that the 35° angle be maintained on the cutting edge while the saw is being used, as well as the length of each tooth being maintained uniform. The side plate C and the intermediate portion D have a substantially 90° cutting edge 24 adjacent the front edge thereof. This cutting edge is also hollow ground, and is integral with the cutting edge 23 carried on the front edge of the top plate E.

When the chain saw is being used to cut a log or the like, successive teeth on the chain define a channel similar to a triangle with the top removed, such as illustrated at 25 in FIG. 4. The chips, such as illustrated in FIGS. 5A and 5B, are formed in this channel 25 during the cutting operation. On conventional teeth the free edge of the top plate extends rearwardly parallel to the longitudinal axis, such as illustrated in the previously mentioned patents, and only the leading cutting edges similar to edges 23 and 24 cut into the wood producing a ragged chip substantially as shown in FIG. 5B. This produces a bouncing effect during the cutting operation which causes undue wear on the guide bar, chain and motor. By using a strobe light the bouncing effect and cutting operation can be closely observed.

In the tooth constructed in accordance with the present invention the free side of the top plate extends inwardly from the intermediate portion D towards the rear of the top plate E at an angle of about 5° relative to the longitudinal axis, as illustrated in FIG. 1. A hollow ground side cutting edge 26 is carried thereon, and aids in removing the chip 27 from the wood 28. It is noted from observing the chip illustrated in FIG. 5A that the sides are relatively smooth and, also, the portion of the chip intermediate the two sides is relatively smooth compared to the chip produced by the conventional chain, such as illustrated in FIG. 5B. By observing the cutting action under a strobe light and comparing that to the conventional chain saw such produces a much smoother cut through the wood thereby, increasing the life of the chain, as well as the motor for the chain saw and working mechanism. It is desired that the side cutting edge 26 taper rearwardly at approximately 5° since, when such as much greater, the cutting edge receives a burn during cutting which dulls such producing substantially the same effect as the teeth presently being used on the conventional saw chain. When the cutting edge tapers rearwardly at much less than 5° then the cutting effect of such is reduced accordingly.

A chain utilizing a cutter tooth constructed in accordance with the present invention is much more stabilized, since the tooth 11 cuts for its entire length, whereas, the old and conventional cutter teeth merely tear into the wood after the initial cut.

The hollow ground edge 26 on the inward side of the top plate completes the cutting cycle all the way through until the chip is thrown out from the saw. The hollow ground edge 26 also balances the tooth load and stabilizes the rear portion of the top plate E. This reduces the jerkiness which normally accompanies conventional teeth, and produces a more even kerf.

The hollow ground edge 26 also, reduces the drag which normally accompanies such edge and allows the teeth to assume the proper path of travel through the kerf. That is, since the frictional drag on edge 26 is reduced the cutting edges 24 on the intermediate portions of the teeth are forced to the outside wall of the kerf, which is most desirable in order that there is proper room in the kerf for the bar 14 and chain. Such, also, produces an even cut or kerf.

In summary, the hollow ground cutting edge 26 smooths out the complete cutting cycle and increases the cutting speed. Such results in less sharpening of the saw chain and increases the life of all components of the saw by minimizing vibrations and jerkiness.

As previously mentioned, a conventional chain saw is illustrated in FIG. 3 having a motor 29, a gas tank 30, a supporting bar 31, and a trigger switch 32.

While a preferred embodiment of the invention has been described using specific terms, such description is for illustrative purposes only, and it is to be understood that changes and variations may be made without departing from the spirit or scope of the following claim.

What is claimed is:

1. In a saw chain having a plurality of spaced teeth coupled together by means of tie straps and drive links, each of said teeth comprising an elongated substantially vertical side plate, spaced holes provided in said side plate for receiving rivets for securing said teeth to said tie straps and drive links, an outwardly extending elongated curved intermediate portion integral with a top portion of said vertical side plate, and an elongated top plate integral with said intermediate portion at one side thereof and extending over the longitudinal axis of said saw chain, said top plate having a front cutting edge extending rearwardly at an angle, the improvement including a side cutting edge at the free edge of said top plate, extending inwardly across the longitudinal axis and extending toward the rear of said top plate at an acute angle relative to said longitudinal axis, said acute angle being sufficiently large so that said side cutting edge aids in cutting a chip from said wood and yet not so large that the side cutting edge is readily burned off during the cutting operation, said side cutting edge being a hollow ground cutting edge, whereby during the cutting operation said side cutting edge cuts into the wood causing said chain to run smoothly with a minimum amount of vibrations and drag.

References Cited

UNITED STATES PATENTS

| 2,652,076 | 9/1953 | Bye | 143—135 |
| 2,788,811 | 4/1957 | Bernard et al. | 143—135 |
| 2,873,775 | 2/1959 | Abbott | 143—135 |
| 3,040,789 | 6/1962 | Mall et al. | 143—135 |

DONALD R. SCHRAN, Primary Examiner

U.S. Cl. X.R.

143—141